Patented Oct. 24, 1950

2,526,885

UNITED STATES PATENT OFFICE 2,526,885

THERMOSETTING COMPOSITIONS HAVING IMPROVED ELECTRICAL PROPERTIES

Richard Lindenfelser and Joseph Grabowski, Stamford, Conn., assignors to American Cyanamid Company, New York, N. Y., a corporation of Maine No Drawing. Application July 3, 1946, Serial No. 681,414

4 Claims. (Cl. 260—39)

1

This invention relates to molding compositions and more particularly it is directed to molding compositions having excellent dielectric properties, and possessing resistance to heat, flame and shrinkage.

It is known that certain thermoplastic resins such as polystyrene and polyethylene possess excellent electrical insulation properties, but they have poor resistance to heat and flame. It is likewise known that some of the thermosetting resins such as the phenolic and aminoplastics possess excellent heat and flame resistance, but have poor dielectric properties.

Accordingly, it is an object of this invention to prepare thermosetting molding compositions having excellent dielectric properties and possessing resistance to heat, flame and shrinkage.

Another object of this invention is to prepare molding compositions suitable for molding around metallic inserts and providing electrical insulation.

A further object of this invention is to provide a new series of molding compositions.

The foregoing and other objects and advantages of this invention are attained by mixing a melamine-formaldehyde resin and an aniline-melamine-formaldehyde resin with silica flour until a homogeneous mixture of proper plasticity for molding is obtained.

It is advisable and has been found to produce optimum results, to prepare a slow setting melamine-formaldehyde-aniline resin by condensing 1 mol of melamine with 3 mols of formaldehyde to form trimethylol melamine or a low polymer thereof, dehydrate to remove most of the water from this reaction mixture, and then react 3 mols of aniline with the reaction mixture and dehydrate under vacuum to a temperature not greater than 140° C.

In order to obtain satisfactory control over the resin, it is advisable to keep the reaction on the alkaline side throughout the process. During the condensation of melamine and formaldehyde, it is preferable to maintain the pH between 7.5 and 10.0 and increase the pH to between 9.5 and 10.0 at the beginning of the concentration step, as it has been found that minimum reaction rate occurs in this range. The reaction temperature at which the condensation of melamine and formaldehyde is effected is usually maintained between 80° and 100° C., since this range gives rapid solution of the melamine and produces a condensate in a reasonable length of time. The period required for reaction depends on the temperature and pH employed, varying between 20 minutes and 2 hours. The time of reaction of aniline and the melamine-formaldehyde condensation product is not critical. The minimum time for reaction and mixing is approximately ½ hour to 1 hour, and it has been continued for as long as three hours, apparently without depreciating the properties of the product obtained. The final temperature of dehydration at full vacuum should be between 130 and 140° C. since lower temperatures give softer resins which are difficult to handle and process, and higher temperatures increase the loss factor, although the increase in loss factor is slight up to approximately 160° C. Since the object of the dehydration is to remove all free water and free aniline without polymerizing the resin unnecessarily, it is advantageous to utilize the highest possible vacuum in this step.

The following examples given by way of illustration and not in limitation, more specifically set forth the invention.

*Example 1*

890 parts of melamine and 1710 parts of 37% aqueous formaldehyde solution were charged to a reaction vessel, adjusted in pH to 8.5 with sodium hydroxide, and heated at a rising temperature to reflux, approximately 30 minutes being required to reach this temperature. It was held at this temperature for approximately 30 minutes, at which time the reaction mixture was slightly hydrophobic, when tested by dropping a few drops of the reaction mixture in ice water. The reaction mixture was cooled to approximately 60° C. and the pH adjusted to 10.0. The reaction mixture was concentrated by heating for approximately an hour under 60 cm. (Hg) vacuum during which time the temperature rose from 59° C. to 75° C. The vacuum was released, 1970 parts of aniline were added to the concentrated resin and reacted for approximately 2½ hours at 100° C. The reaction mixture was then concentrated by heating under 71 cm. (Hg) vacuum during which time the temperature rose from 88° C. to 130° C., care being taken not to exceed a temperature of 140° C. The product obtained in this manner was a clear, straw-colored resin. The resin obtained in the above manner was granulated, and 20 parts of it were mixed with 20 parts of a melamine-formaldehyde resin (1:2 ratio) and 60 parts silica flour. They were blended by mixing for approximately 20 minutes at room temperature, after which time the blended mixture was charged to heated differential rolls and milled at 110° C. for a period varying between two and four minutes. When the desired plasticity for correct molding was obtained, the material was removed from the rolls in sheet form, and granulated.

Articles obtained from the above molding composition, when molded at 300° F. and 3000 lbs./sq. in. for 10 minutes, possessed a flexural strength of 5000–9000 lbs./sq. in., an arc resistance (ASTM) of 130–150 seconds, a dielectric strength (volts/mil) of 590–610 at room temperature, and 520–650 at 100° C., a dielectric constant $10^6$ cycles) of 4.2 to 4.5, a power factor ($10^6$ cycles) of 0.5 to 0.8, and a loss factor ($10^6$ cycles) of 2.1 to 3.5.

Satisfactory results may be obtained, wherein smaller ratio of aniline is used than 3:1:3 (aniline-melamine-formaldehyde); however, if much less than 2½ mols of aniline are used, the reaction is difficult to control and the molded products obtained from resins of other ratios have substantially increased electrical loss factors. The thermosetting melamine formaldehyde resins which may be employed satisfactorily, are those wherein molar ratio of formaldehyde and melamine varies between 1.5:1, and 4:1. However, optimum mechanical properties are obtained when the thermosetting resin comprises about 2 mols of formaldehyde per mol of melamine.

Other aromatic amines may be substituted for aniline to obtain a useable product. However, the other aromatic amines tested have exhibited an increased electrical loss factor over the aniline modified resins. For example, orthoaminodiphenylamine and alpha-naphthylamine, when substituted for aniline in the above example, showed increased loss factors. Likewise, other amino compounds may be used in place of melamine in either of the resins. For example, urea has given satisfactory results when used in place of melamine. However, the optimum results were obtained with melamine.

Other resins may be incorporated in the composition described in Example 1 to enhance other properties inherent in the resins. It is advisable, when incorporating other materials or resins in the composition to do so during the formulation of the composition. For example, when a small amount of compatible aniline cresol formaldehyde resin is added during the formulation of the composition, it appears to improve the mechanical properties and arc resistance of the compound without decreasing the dielectric properties, as is illustrated in the following example.

*Example 2*

A molding composition was prepared in the following manner. 16 parts of aniline-melamine-formaldehyde (3:1:3 ratio), 20 parts melamine-formaldehyde resin (1:2 ratio), 4 parts aniline cresol formaldehyde resin, and 60 parts silica flour, were blended and molded according to the procedure outlined in Example 1 to yield a product having the following properties: a flexural strength of 11,000 lbs./sq. in., an impact strength of .328 lbs./sq. in., a mold shrinkage of 6.8 mills per inch, an after shrinkage of 1.2 mills per inch, an arc resistance (ASTM) of 154 seconds, a dielectric strength above 650 volts/mill at 100° C., a power factor ($10^6$) of 0.7, a dielectric constant ($10^6$) of 4.3, and a loss factor ($10^6$) of 3.0.

The following table is a tabulation of some experiments performed according to the procedure outlined in Example 1 wherein various proportions of materials as well as the materials themselves were modified.

| 40% Resin | | | 60% Filler | | Cure | Flexural Strength | | | Shrinkage | | Arc Resistance, A. S. T. M. Seconds |
|---|---|---|---|---|---|---|---|---|---|---|---|
| Per cent Aniline Melamine Formaldehyde (3-1-3) | Per cent Melamine Formaldehyde (1-2) | Per cent Aniline Cresol | Per cent Silica Flour | Per cent Modifier | Dish 5' to 7' Bar 7' to 10' Temp. | P. s. i. | Defl., inches/in. | Izod, ft. lb./in. | Mold mils/in. | After 8 hrs. @ 220° F., mils/in. | |
| | | | | | °C. | | | | | | |
| 50 | 50 | ------ | 90 | 10 cotton flock. | 155 | 8,250 | .019 | .334 | ------ | -------- | 148 |
| 50 | 50 | ------ | 90 | 10 glass fiber. | -------- | 6,900 | .019 | .285 | 4.2 | 1.4 | 156 |
| 50 | 50 | ------ | 90 | 10 mica. | -------- | 5,700 | .019 | .338 | 5.0 | 1.6 | 138 |
| 60 | 40 | ------ | 100 | -------- | -------- | 5,400 | .016 | .256 | 4.8 | 1.0 | 140 |
| 40 | 60 | ------ | 100 | -------- | -------- | 11,100 | .028 | .362 | 5.7 | 1.5 | 186 |
| 45 | 50 | 5 | 100 | -------- | -------- | 9,400 | .024 | .333 | 6.5 | 1.5 | 174 |
| 40 | 50 | 10 | 100 | -------- | -------- | 11,150 | .024 | .308 | 4.9 | 2.0 | 182 |
| 50 | 35 | 15 | 100 | -------- | -------- | 9,800 | .023 | .338 | 6.8 | 1.5 | 192 |

| Dielectric Strength | | Dielectric loss | | |
|---|---|---|---|---|
| 100° C., Volts/Mil | Room Temp. Volts/Mil | Power Factor, $10^6$ Cycles | Dielectric Constant, $10^6$ Cycles | Loss Factor, $10^6$ Cycles |
| 630 | 580 | 1.1 | 4.5 | 5.0 |
| 710 | -------- | 0.7 | 4.5 | 3.2 |
| 670 | 580 | 0.6 | 4.4 | 2.6 |
| >590 | 600 | 0.6 | 4.2 | 2.5 |
| >590 | 560 | 0.7 | 4.4 | 3.1 |
| >610 | 550 | 0.6 | 4.3 | 2.6 |
| >610 | 610 | 0.6 | 4.4 | 2.6 |
| 660 | 550 | 0.6 | 4.3 | 2.6 |

Articles obtained as outlined above have the combined properties of excellent insulation, hardness, resistance to heat, flame, and solvents, and have improved resistance to shrinkage. Accordingly, they may be used for insulating parts of high frequency and other special electrical applications, radio tube bases, coil forms and housings, and television equipment. They may be used according to the formulation given in the examples and the table, or they may be modified with other materials to meet other special utilitarian purposes.

We claim:

1. A thermosetting molding composition comprising a melamine-formaldehyde resin wherein the ratio of formaldehyde to melamine is 1.5-4 mols of formaldehyde per mol of melamine, aniline - melamine - formaldehyde resin wherein the mol ratio is 3:1:3 respectively, and silica flour, said aniline-melamine-formaldehyde resin being present in an amount of 40%-60% of the total resin weight.

2. A thermosetting molding composition comprising 20 parts of a melamine-formaldehyde resin having a ratio of 2 mols of formaldehyde per mol of melamine, 20 parts of aniline-melamine-formaldehyde resin having a mol ratio of 3:1:3 respectively, and 60 parts silica flour.

3. A thermosetting, molding composition comprising 40% synthetic resin and 60% silica flour, said synthetic resin comprising 40%-60% aniline-melamine-formaldehyde resin having a mol ratio of 3:1:3 respectively, and 40%-60% melamine-formaldehyde resin having a mol ratio of 1:2 respectively.

4. A process for preparing a thermosetting molding composition comprising mixing 40-60% by weight of a dry melamine-formaldehyde resin, 60-40% by weight of a dry aniline-melamine-formaldehyde resin, wherein said percentages by weight are based on the total resin weight, and silica flour at room temperature, and thereafter blending the mixture on heated differential rolls at an elevated temperature for a period of time sufficient to effect adequate plasticity for direct molding, said melamine-formaldehyde resin has a mol ratio of 1:1.5 to 1:4, respectively, and said aniline-melamine-formaldehyde resin has a mol ratio of 3:1:3, respectively.

RICHARD LINDENFELSER.
JOSEPH GRABOWSKI.

REFERENCES CITED

The following references are of record in the file of this patent:

FOREIGN PATENTS

| Number | Country | Date |
|---|---|---|
| 104,382 | Australia | Feb. 11, 1937 |
| 412,373 | Canada | May 11, 1943 |